(12) United States Patent
Christoffer et al.

(10) Patent No.: US 10,253,824 B2
(45) Date of Patent: Apr. 9, 2019

(54) FRICTION RING FOR A SYNCHRONIZATION UNIT

(71) Applicant: OERLIKON FRICTION SYSTEMS (GERMANY) GMBH, Bremen (DE)

(72) Inventors: Ulf Christoffer, Bremen (DE); Dietmar Koester, Bremen (DE); Marcus Spreckels, Oyten (DE)

(73) Assignee: OERLIKON FRICTION SYSTEMS (GERMANY) GMBH, Bremen (DE)

( * ) Notice: Subject to any disclaimer, the term of this patent is extended or adjusted under 35 U.S.C. 154(b) by 78 days.

(21) Appl. No.: 15/267,834

(22) Filed: Sep. 16, 2016

(65) Prior Publication Data

US 2017/0102038 A1    Apr. 13, 2017

(30) Foreign Application Priority Data

Oct. 7, 2015  (EP) .................................... 15188810

(51) Int. Cl.
| | |
|---|---|
| *F16D 23/02* | (2006.01) |
| *F16D 13/26* | (2006.01) |
| *F16D 13/66* | (2006.01) |
| *F16D 23/06* | (2006.01) |

(52) U.S. Cl.
CPC ............. *F16D 23/02* (2013.01); *F16D 13/26* (2013.01); *F16D 13/66* (2013.01); *F16D 23/025* (2013.01); *F16D 23/06* (2013.01); *F16D 2023/0681* (2013.01); *F16D 2200/0021* (2013.01)

(58) Field of Classification Search
CPC ........ F16D 23/02; F16D 23/025; F16D 23/06; F16D 2023/0681
See application file for complete search history.

(56) References Cited

U.S. PATENT DOCUMENTS

| | | | |
|---|---|---|---|
| 3,414,098 A | | 12/1968 | Kelbel |
| 4,445,602 A | * | 5/1984 | Chana ..................... F16D 23/06 |
| | | | 192/53.32 |
| 4,698,889 A | | 10/1987 | Patzer |
| | | (Continued) | |

FOREIGN PATENT DOCUMENTS

| | | |
|---|---|---|
| CN | 103573842 | 2/2014 |
| DE | 197 19 618 | 11/1998 |

(Continued)

OTHER PUBLICATIONS

Office Action dated Jul. 11, 2018 and issued in EP 16 190 642.
European Office Action issued in Application No. 16 190 642.5 (5 pages).

*Primary Examiner* — David R Morris
(74) *Attorney, Agent, or Firm* — Greenblum & Bernstein, P.L.C.

(57) ABSTRACT

Friction ring for a synchronization unit of a gear changing transmission. The friction ring, when in an uninstalled state, is circumferentially pre-loaded and includes an annular front side, an annular rear side, a conical inner friction surface, a conical outer installation surface, and a first separation surface facing and in contact with a second separation surface and defining a circumferential separation area in the friction ring. The friction ring is prevented from contracting radially and circumferentially by said contact and is capable of expanding radially and circumferentially while being circumferentially pre-loaded.

20 Claims, 7 Drawing Sheets

(56) References Cited

U.S. PATENT DOCUMENTS

| | | | |
|---|---|---|---|
| 4,732,247 A | 3/1988 | Frost | |
| 4,742,723 A | 5/1988 | Lanzerath | |
| 5,560,461 A | 10/1996 | Loeffler | |
| 6,065,579 A | 5/2000 | Nels | |
| 6,688,563 B1 | 2/2004 | Waxham et al. | |
| 8,342,307 B2 | 1/2013 | Christoffer | |
| 9,400,019 B2* | 7/2016 | Skipper | F16D 23/025 |
| 9,863,484 B2* | 1/2018 | Skipper | F16D 23/025 |
| 2008/0067026 A1 | 3/2008 | Spreckels | |
| 2008/0149450 A1 | 6/2008 | Christoffer | |
| 2009/0133982 A1 | 5/2009 | Christoffer | |
| 2013/0333998 A1* | 12/2013 | Skipper | F16D 23/025 192/53.34 |
| 2015/0167749 A1 | 6/2015 | Skipper | |
| 2016/0377125 A1 | 12/2016 | Christoffer | |

FOREIGN PATENT DOCUMENTS

| | | | |
|---|---|---|---|
| DE | 198 53 856 | 5/2000 | |
| DE | 199 22 325 | 7/2000 | |
| DE | 102007058573 | 6/2009 | |
| DE | 102012014314 | 1/2014 | |
| EP | 0 280 136 | 8/1988 | |
| EP | 1 199 489 | 4/2002 | |
| EP | 1 312 823 | 5/2003 | |
| EP | 1 507 091 | 8/2006 | |
| EP | 2 677 187 | 5/2013 | |
| EP | 2 894 363 | 7/2015 | |
| EP | 3 109 498 | 12/2016 | |
| JP | 58-74628 | 5/1983 | |
| JP | 62-46047 | 2/1987 | |
| JP | 62-46048 | 2/1987 | |
| JP | 8-219173 | 8/1996 | |
| JP | 8-219175 | 8/1996 | |
| JP | 10-78047 | 3/1998 | |
| JP | 2004-76764 | 3/2004 | |
| JP | 2005-344849 | 12/2005 | |
| WO | WO-2010066558 A1 * | 6/2010 | F16D 23/025 |

* cited by examiner

Fig. 1A

Prior Art

Fig. 1B

Prior Art

Fig. 1C

Prior Art

Fig. 1D

Prior Art

Fig. 1E

Prior Art

Fig. 4F

FRICTION RING FOR A SYNCHRONIZATION UNIT

CROSS-REFERENCE TO RELATED APPLICATIONS

The present application claims priority under 35 U.S.C. § 119(a) of European Patent Application No. EP 15 188 810.4 filed Oct. 7, 2015, the disclosure of which is expressly incorporated by reference herein in its entirety.

BACKGROUND OF THE INVENTION

1. Field of the Invention

The invention relates to a friction ring for a synchronization unit of a switchable gear changing transmission. The invention relates also to a synchronization unit having a friction ring.

2. Discussion of Background Information

In synchronization units of a mechanical switchable gear changing transmission, e.g. in vehicle transmissions, friction rings serve to synchronize the relative speeds which occur between the gear wheel and the gear shaft during a gear change to one another. The synchronization is achieved in this respect by friction between the corresponding friction partners. The function of such transmissions and the process of the synchronization are known per se and no longer have to be explained in more detail to the person skilled in the art. Friction rings of synchronization units or other components of synchronization units have also been described in a versatile and detailed manner in the prior art.

EP 2 894 363 A1, for example, shows a generic friction ring. The friction ring comprises a conical friction ring body having an inner friction surface and an outer installation surface, wherein the inner friction surface extends at a predefinable friction angle and the outer installation surface extends at a predefinable installation angle conically along a friction ring axis. Due to the fact that the friction angle differs from the installation angle, an independent optimization of the functions "Synchronize" and "Separate" is possible. The friction ring body is formed as a segmented friction ring body which comprises a plurality of separate friction ring segments which form the friction ring body in a ring-shaped arrangement. EP 2 894 363 A1 shows also a friction ring body which consists of a single segment instead of a plurality of separate friction ring segments, wherein the friction ring body has a slit which is arranged perpendicular to the friction ring axis.

In the installed state the friction ring is positively connected to a conical synchronizer ring. In this respect the synchronizer ring has a conical inner installation surface which is formed corresponding to the outer installation surface of the friction ring. The friction ring is secured in the axial and radial direction to the friction ring axis via the conical inner installation surface of the synchronizer ring. Furthermore, securing mechanisms against rotation are provided at the friction ring ensuring that the friction ring is essentially connected also non-rotatably to the synchronizer ring, i.e. apart from little angular deflections occurring in a circumferential direction around the friction ring axis the friction ring is connected non-rotatably to the synchronizer ring.

In order to explain this friction ring reference is made in the following to the schematic FIG. 1a to FIG. 2 on the basis of which the prior art previously described will be described in more detail. In order to differentiate between the prior art and the present invention the reference numerals which refer to features of known examples are marked with an apostrophe, whereas the reference numerals which refer to features of examples according to the invention have no apostrophe.

In the following the friction ring is designated as a whole by the reference numeral 1', the synchronizer ring by the reference numeral 2' and the synchronization unit by the reference numeral 3'.

Figure 1A:
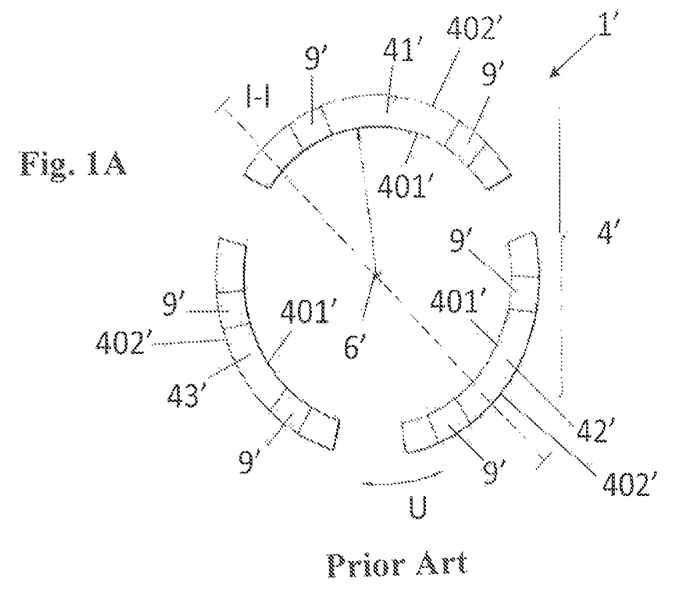
FIG. 1a shows a first embodiment of a known segmented friction ring consisting of several segments in an expanded configuration.
Figure 1B:
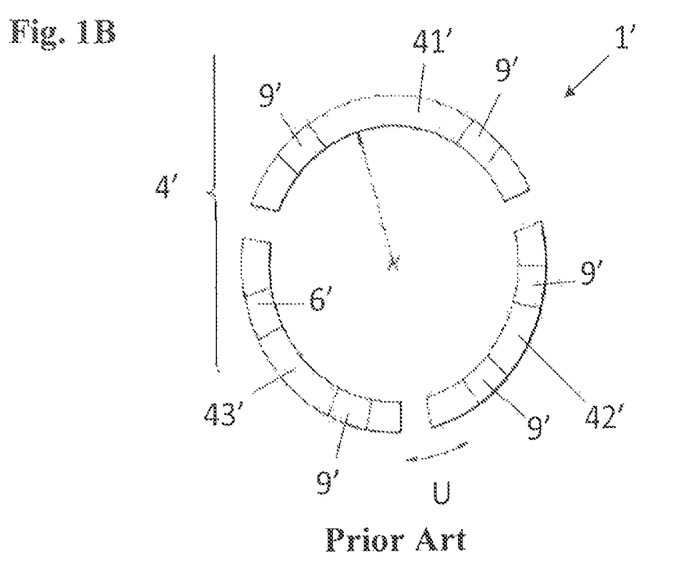
FIG. 1b shows the friction ring in accordance with FIG. 1a in a compressed configuration.
Figure 1C:
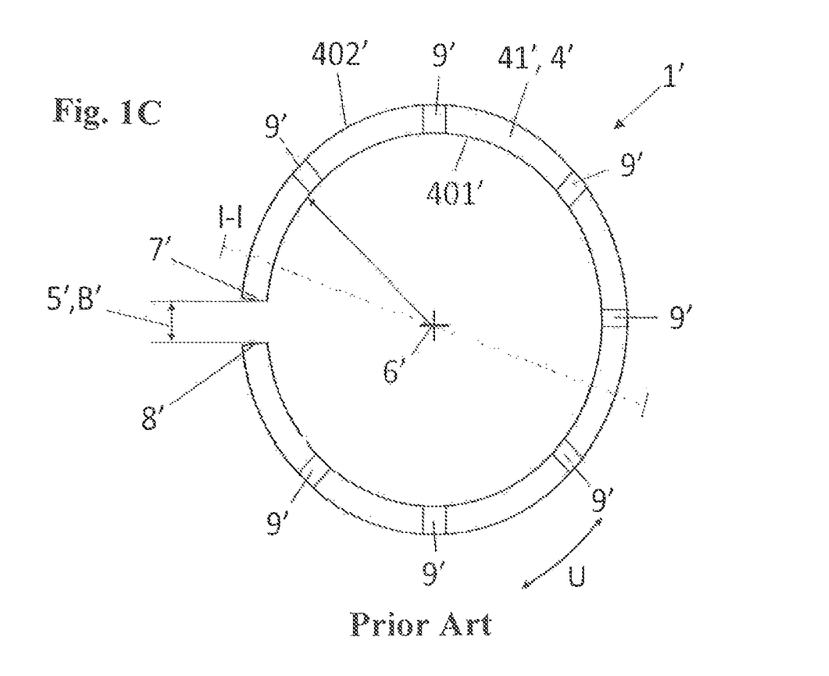
FIG. 1c shows a second embodiment of a known segmented friction ring consisting of a single segment.

In a schematic representation the FIG. 1a and FIG. 1b show one and the same embodiment of a known segmented friction ring 1'. FIG. 1a shows the friction ring 1' having a segmented friction ring body 4' in an expanded configuration, whereas FIG. 1b shows the same friction ring 1' in a compressed configuration. FIG. 1c shows a second embodiment of a known segmented friction ring 1'. For a better understanding FIG. 1d shows a section along the line I-I according to FIG. 1a or FIG. 1c, whereas FIG. 1e shows a section of the friction ring 1' according to FIG. 1a or FIG. 1c in a perspective view.

As can clearly be recognized with reference to FIG. 1a and FIG. 1b, the friction ring body 4' in this embodiment is a segmented friction ring body 4' which comprises a plurality of separate friction ring segments 41', 42', 43', in the present embodiment, that is, three friction ring segments 41', 42', 43' which form the friction ring body 4' in a ring-shaped arrangement. As it is shown in FIG. 1c, the friction ring body 4' can also consist of a single segment 41' instead of a plurality of separate friction ring segments. In this respect the friction ring body 4' has one single separation area 5' in the form of a slit which is perpendicular to a friction ring axis 6'. The slit has a width B'. Due to the slit a first separation surface 7' and a second separation surface 8' of the friction ring body 4' are arranged at a distance from each other.

Figure 1D:
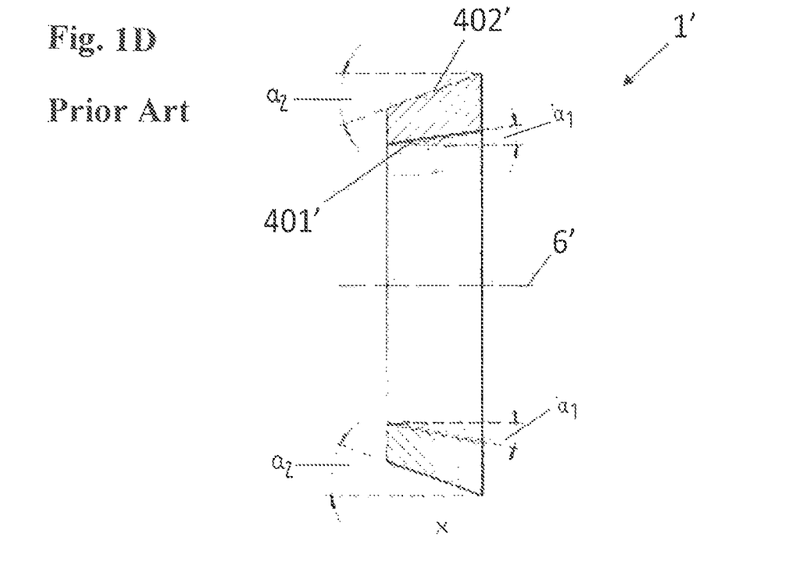
FIG. 1d shows a section along the line I-I in accordance with FIG. 1a and FIG. 1c.

According to FIG. 1d the friction ring 1' comprises a conical friction ring body 4' having an inner friction surface 401' and an outer installation surface 402' which each bound the friction ring body 4' in a radial direction extending perpendicular to the axial friction ring axis 6'. In this respect, the inner friction surface 401' extends at a predefinable friction angle $\alpha_1$ and the outer installation surface 402' extends at a predefinable installation angle $\alpha_2$, in each case conically along the friction ring axis 6'. Due to the fact that the friction angle $\alpha_1$ differs from the installation angle $\alpha_2$, an independent optimization of the functions "Synchronize" and "Separate" is possible.

Figure 1E:
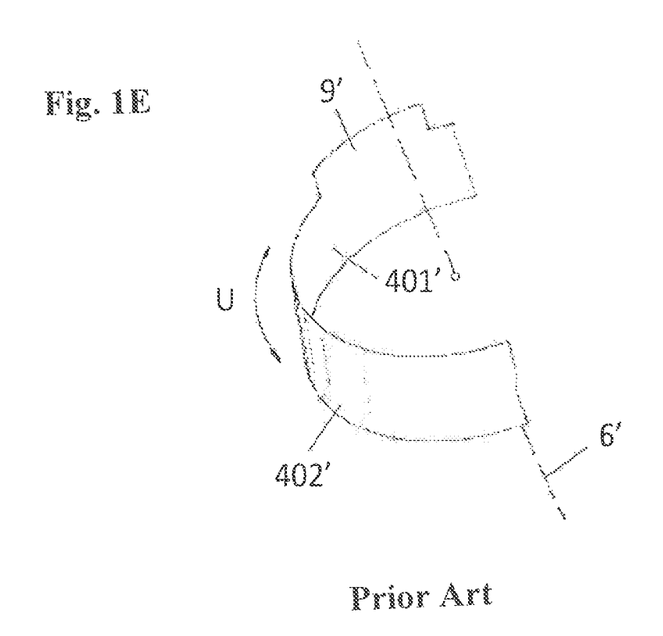
FIG. 1e shows a section of the friction ring in accordance with FIG. 1a and FIG. 1c in a perspective view.

As can be seen from FIG. 1e, a plurality of securing mechanisms against rotation 9' or tabs are provided at the friction ring body 4' which extend along the friction ring axis 6'. The securing mechanisms against rotation 9' are arranged at the friction ring body 4' in the circumferential direction U and engage in the installed state into corresponding tabs provided at the synchronizer ring 2'. The securing mechanisms against rotation 9' ensure that the friction ring 1' is essentially connected non-rotatably to the synchronizer ring 2'.

Figure 2:
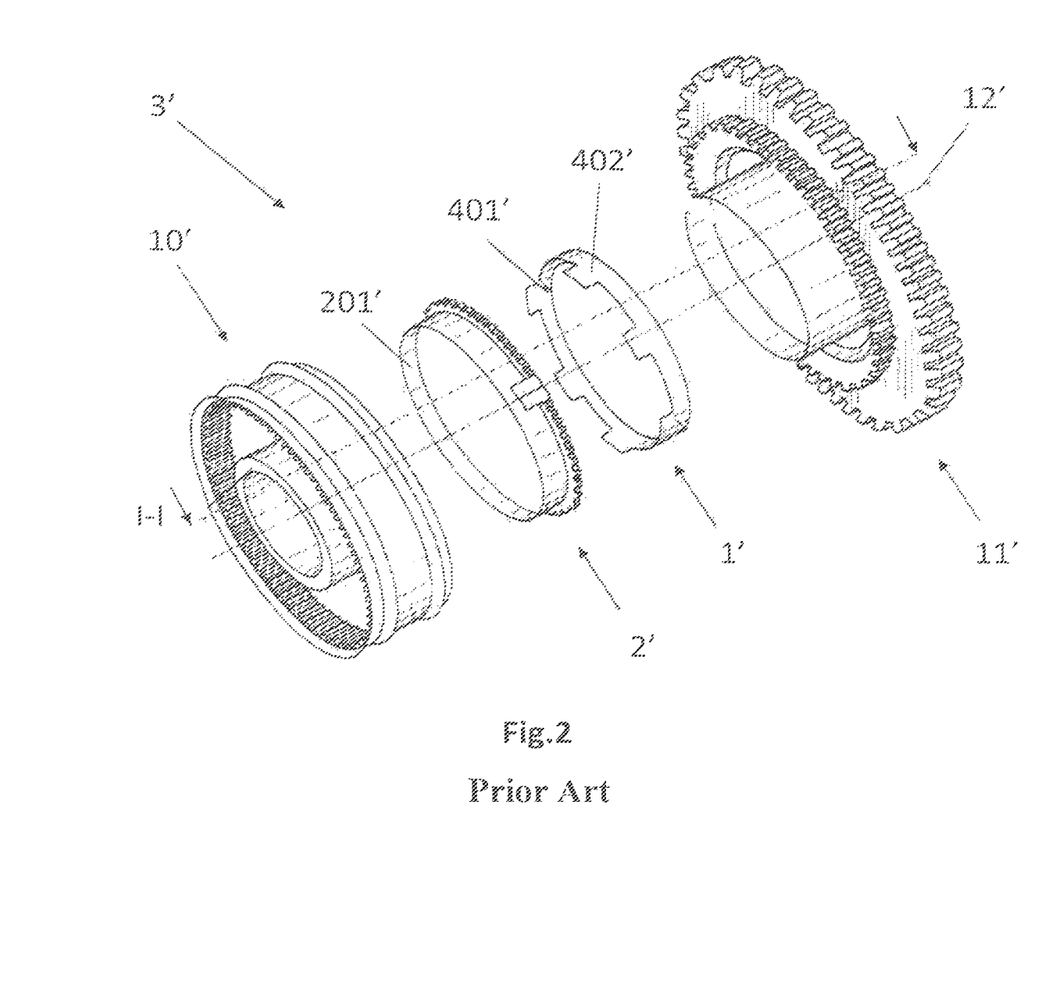
FIG. 2 shows a synchronization unit known from the prior art.

FIG. 2 shows an exploded diagram of a known synchronization unit 3' comprising a friction ring 1' and a synchronizer ring 2'. According to FIG. 3 the synchronization unit 3' further comprises, in addition to the friction ring 1' and the synchronizer ring 2', in a manner known per se a sliding sleeve 10' and a gear wheel 11', wherein the aforesaid components are arranged coaxially to an axis 12' of the synchronization unit 1' such that the synchronizer ring 2' can be displaced in the operating state by the sliding sleeve 10' together with the friction ring 1' along the axis 12' in the direction towards the gear wheel 11' so that the inner friction surface 401' of the friction ring body 4' can be brought into engagement with the gear wheel 11'.

Thanks to the use of the described segmented slitted friction ring some improvements have been made in practice.

Due to the fact that the friction ring is segmented, i.e. it has at least one slit, an expansion of the friction ring towards a bigger circumference of the ring is possible. And that is indispensable for avoiding the self-locking effect at the inner friction surface of the friction ring. Thanks to this fact the gear-shifting quality has been essentially improved.

But it has also become evident that even this improved friction ring which has proven itself in practice in the meantime can be further improved.

A major disadvantage of the slitted friction ring is that due to its arrangement in the axial direction relative to the synchronizer ring the friction ring cannot be clearly positioned. The friction ring can be deformed elastically by applying low forces in such a way that the slit closes until both separation surfaces touch each other. This includes a reduction of the circumference of the friction ring body with the result that the friction ring takes an uncontrolled axial position relative to the synchronizer ring during the synchronization. This uncontrolled axial position of the friction ring has a negative effect on the synchronizing process and thus on the gear-shifting quality.

Consequently, the outer installation surface of the friction ring and the inner installation surface of the synchronizer ring are unevenly used and thus worn. In order to counteract the wear of the installation surfaces caused hereby, a time-consuming, costly coating of the installation surfaces or the use of high-quality, expensive materials may be necessary.

A further disadvantage of the uncontrolled axial positioning of the friction ring relative to the synchronizer ring during the synchronization is that the synchronization unit is subject to increased mechanical load. This can, for example, lead to harmful vibrations or a higher shifting force and disrupts the reliability and accuracy of the synchronization. The cited effects are the more important the higher the synchronizing torque to be transmitted by the synchronization unit is.

SUMMARY OF THE INVENTION

Therefore, the invention's purpose is to suggest a further improved friction ring for a synchronization unit where the friction ring is positioned in a controlled manner during the synchronization relative to the synchronizer ring in the axial direction without having any negative consequences on the self-locking effect so that the disadvantages known from the prior art are largely avoided.

The subject matters of the invention which solve these problems are characterized by the features described herein.

Other particularly advantageous embodiments of the invention are also described herein.

Consequently, the invention relates to a friction ring for a synchronization unit of a gear changing transmission comprising a conical friction ring body having an inner friction surface and an outer installation surface which each bound the friction ring body in a radial direction extending perpendicular to an axial friction ring axis. In this respect, the inner friction surface extends at a predefinable friction angle and the outer installation surface extends at a predefinable installation angle conically along the friction ring axis. The friction ring body is interrupted in a circumferential direction extending around the friction ring axis by a separation area in such a way that a first separation surface and a second separation surface are formed at the separation area.

According to the invention the first separation surface and the second separation surface of the friction ring contact each other in a predefinable area in such a way that the friction ring body is shaped in the form of a closed contour in the circumferential direction with a smallest circumference or smallest diameter. The term "closed contour" means that the friction ring body is shaped in the form of a closed ring in the circumferential direction.

This means that within the scope of this invention the friction ring can only deform elastically towards a bigger circumference or a bigger diameter. This is the difference from the prior art disclosing a segmented friction ring which can also deform elastically by the application of forces towards a smaller circumference or a smaller diameter.

An essential advantage of the friction ring according to the invention is that due to its arrangement relative to the synchronizer ring the friction ring can be clearly positioned in the axial direction. As the first separation surface and the second separation surface contact each other according to the invention, i.e. the width of the slit is 0 mm, the circumference of the friction ring can no longer deform elastically towards a smaller circumference in contrast to the friction ring known from the prior art. As a result, the friction ring takes a controlled axial position relative to the synchronizer ring during the synchronization and this has a positive effect on the synchronization process and thus on the shifting quality.

Consequently, the outer installation surface of the friction ring and the inner installation surface of the synchronizer ring are used more evenly and thus are subject to lower wear. Furthermore, the whole synchronization unit is exposed to lower mechanical load.

As the friction ring has a separation area, an expansion of the friction ring towards a bigger circumference of the ring is possible. This is to prevent the self-locking effect at the inner friction surface of the friction ring as it is already known from the friction ring disclosed in the prior art.

In a preferred embodiment the first separation surface and the second separation surface contact each other by a circumferential preload. The term "circumferential preload" means within the scope of this application that the friction ring body is loaded or prestressed in the circumferential direction. The "circumferential preload" ensures that the first separation surface and the second separation surface touch each other reliably in a predefinable area and the friction ring can only be deformed elastically in the circumferential direction towards a bigger circumference. Such contact of both separation surfaces, when a "circumferential preload" is applied, can be achieved, for example, as follows: compressive stresses or residual compressive stresses can be induced into the outer installation surface, for example by thermal treatment or mechanical irradiation of the friction ring body. Shearing or breaking reduces the necessary residual stresses, as no gap has to be closed. Ideally, the "circumferential preload" is shaped in such a way that a force of 2 to 20 N is applied on each of the separation surfaces. This ensures—even if unavoidable forces such as centrifugal forces are applied on the friction ring—that the first separation surface and the second separation surface contact each other reliably.

In an embodiment which is very important for the practice the friction ring body can be deformed elastically in the circumferential direction in such a way that a circumference of the friction ring in relation to the smallest circumference can be increased. For this reason the friction ring can expand towards a bigger circumference so that the self-locking effect at the inner friction surface of the friction ring can be avoided.

It has also proven to be advantageous if the separation area extends at a predefinable separation angle to the circumferential direction. Preferably, but not obligatory, the separation area can extend orthogonally to the circumferential direction. This makes the production of the friction ring simple and inexpensive.

In a further embodiment which is very important for the practice the first separation surface is shaped in the form of a first profile and the second separation surface is shaped in the form of a second profile in such a way that the first profile and the second profile engage with one another so that the first separation surface and the second separation surface cannot essentially be displaced against each other in the direction of the friction ring axis. This means that the separation area is not formed as a straight line. The term "essentially" means that the first separation surface and the second separation surface cannot be moved against each other except for small displacements in the axial direction.

In this respect it has proven to be advantageous if the first profile and the corresponding second profile are shaped in the form of a separating lock in such a way that the circumference of the friction ring in relation to the smallest circumference is limited by the separating lock to a predefinable maximum circumference. I.e. due to the separating lock the friction ring can deform elastically in the circumferential direction only up to a certain circumference.

There are different ways of forming the first profile and the second profile. In practice the following embodiments have proven to be advantageous.

It has proven to be especially advantageous if the first profile is formed as a rectangular projection and the second profile is formed as a rectangular recess. It is also possible to shape the first profile as a projection having the form of a dovetail and the second profile as a recess having the form of a dovetail. It would also be conceivable to shape the first profile as a projection having the form of an arrowhead and the second profile as a recess having the form of an arrowhead. The first profile and the second profile can also be formed in such a way that the first profile constitutes a convex projection and the second profile constitutes a concave recess. Furthermore, the first profile can be shaped as a circular projection and the second profile as a circular recess.

Moreover, it has proven to be advantageous if a coating, in particular a friction coating, is provided at the friction surface of the friction ring. The friction coating can, for example, be made in the form of a carbon friction lining.

The friction ring is advantageously a stamped steel part or a shaped sheet metal part. This makes the production of the friction ring simple and inexpensive.

The friction ring according to the invention is used in a synchronization unit of a gear changing transmission for a vehicle, in particular for a passenger vehicle, a transporter or a truck.

BRIEF DESCRIPTION OF THE DRAWINGS

In the following the invention will be explained in more detail on the basis of the schematic drawings.

DETAILED DESCRIPTION OF THE INVENTION

As already mentioned, FIG. 1a to FIG. 2 show the prior art and have already been explained in detail at the beginning so that any further discussion may not be considered necessary.

Figure 3A:
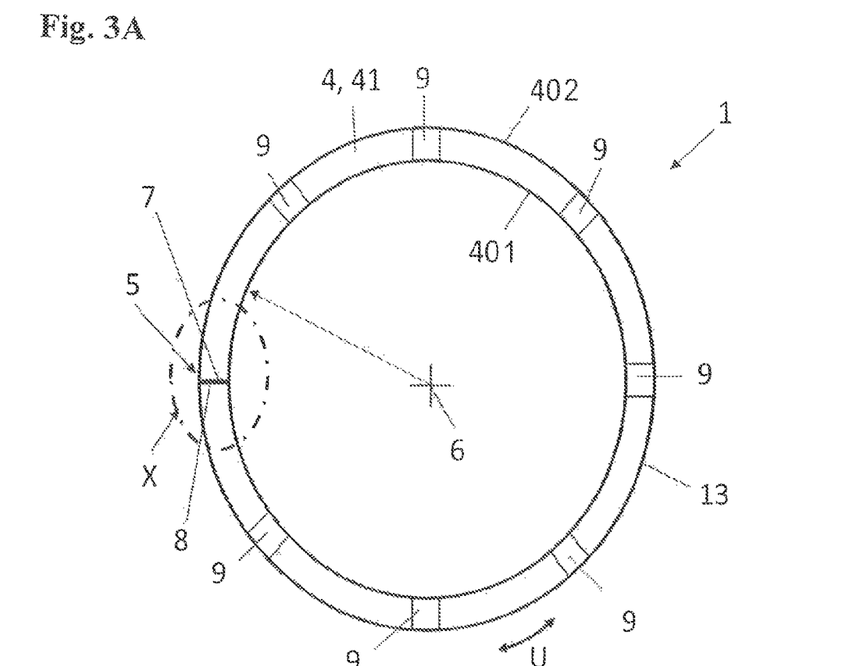
FIG. 3a shows a first embodiment of a friction ring according to the invention.

FIG. 3a shows a first embodiment of a friction ring according to the invention which is designated in the following as a whole by the reference numeral 1. The reference numerals used in the FIG. 3a to FIG. 4f have no apostrophe because these figures refer to embodiments of the present invention. As already mentioned above, only the reference numerals used in the FIG. 1a to FIG. 2 have an apostrophe, because they refer to embodiments known from the prior art.

The friction ring 1 comprises a conical friction ring body 4 having an inner friction surface 401 and an outer installation surface 402 which each bound the friction ring body 4 in a radial direction extending perpendicular to an axial friction ring axis 6. As in the case of the known friction ring shown in FIG. 1d the inner friction surface 401 extends at a predefinable friction angle $\alpha_1$ and the outer installation surface extends at a predefinable installation angle $\alpha_2$ conically along the friction ring axis 6, wherein the predefinable friction angle $\alpha_1$ differs from the predefinable installation angle $\alpha_2$. The friction ring body 4 is interrupted in a circumferential direction U extending around the friction ring axis 6 by a separation area 5 in such a way that a first separation surface 7 and a second separation surface 8 are formed at the separation area 5, wherein the separation area 5 extends orthogonally to the circumferential direction U. In contrast to the known friction ring which is shown in FIG. 1c, the first separation surface 7 and the second separation surface 8 touch each other in such a way that the friction ring body 4 is shaped in the form of a closed ring in the circumferential direction U with a smallest circumference 13 or a smallest diameter. As a result, the friction ring 1 can only deform elastically by the application of forces towards a bigger circumference or a bigger diameter so that the self-locking effect at the inner friction surface 401 of the friction ring 1 can be avoided.

Figure 3B:
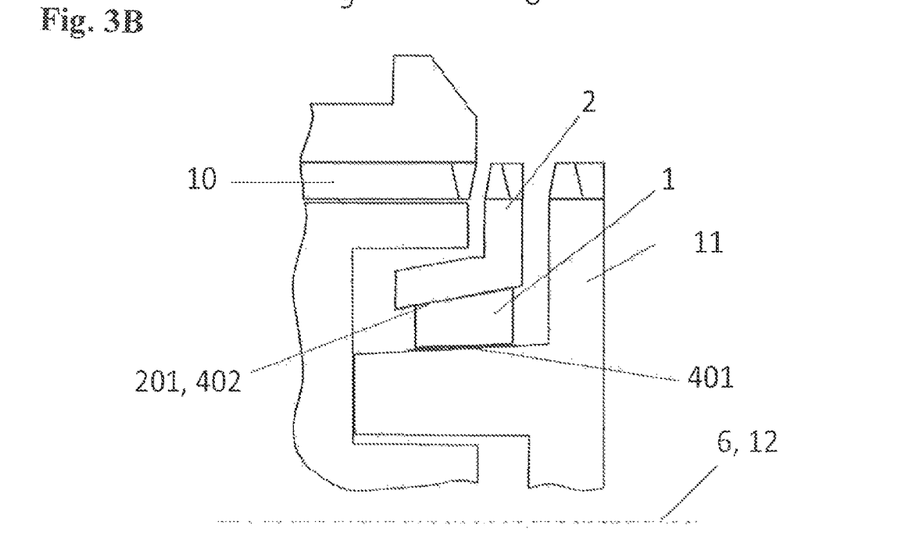
FIG. 3b shows a section along the line I-I in accordance with FIG. 2 having a friction ring in accordance with FIG. 3a, FIG. 4a shows a detailed view X in accordance with FIG. 3a, FIG. 4b shows a detailed view X in accordance with FIG. 3a of a second embodiment of a friction ring according to the invention.

As can be seen from FIG. 3b, due to this form the friction ring 1 can be clearly positioned within the synchronization unit 3 relative to the synchronizer ring 2 in the axial direction. As the first separation surface 7 and the second separation surface 8 touch each other, the circumference of the friction ring 1 can no longer deform elastically towards a smaller circumference or a smaller diameter. For this reason the friction ring 1 takes a controlled axial position relative to the synchronizer ring 2 during the synchronization.

It is also possible that the first separation surface 7 and the second separation surface 8 of the friction ring 1 shown in FIG. 3a touch each other, when a circumferential preload 14 is applied, that is, the friction ring body 4 is loaded or prestressed in the circumferential direction U, wherein the force applied on both separation surfaces 7, 8 is preferably between 2 and 20N. This ensures, even if unavoidable forces such as centrifugal forces are applied on the friction ring 1, that the first separation surface 7 and the second separation 8 touch each other reliably.

FIG. 4a to FIG. 4f show in each case a detailed view X in accordance with FIG. 3a, wherein FIG. 4b to FIG. 4f show further embodiments of a friction ring 1 according to the invention.

As to the embodiments of the friction ring 1 according to FIG. 4b to FIG. 4f, the first separation surface 7 is shaped in the form of a first profile 15 and the second separation surface is shaped in the form of a corresponding second profile 16, i.e. in contrast to the embodiment shown in FIG. 3a the separation area 5 is not formed as a straight line. The first profile 15 and the second profile 16 engage with one another in such a way that the first separation surface 7 and the second separation surface 8 cannot essentially be displaced against each other in the direction of the friction ring axis 6, i.e. in the axial direction.

Figure 4A:
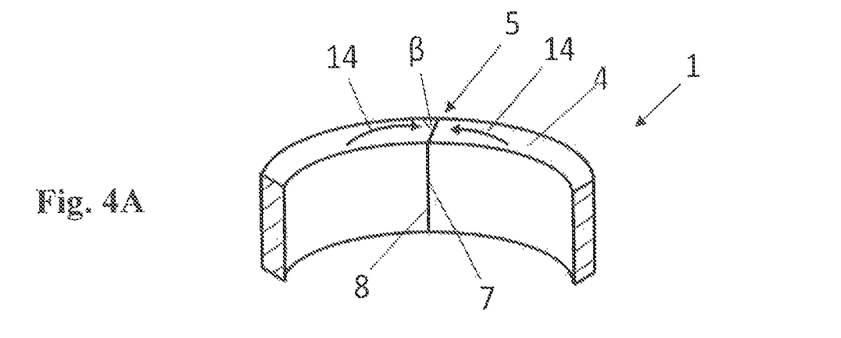
Figure 4B:
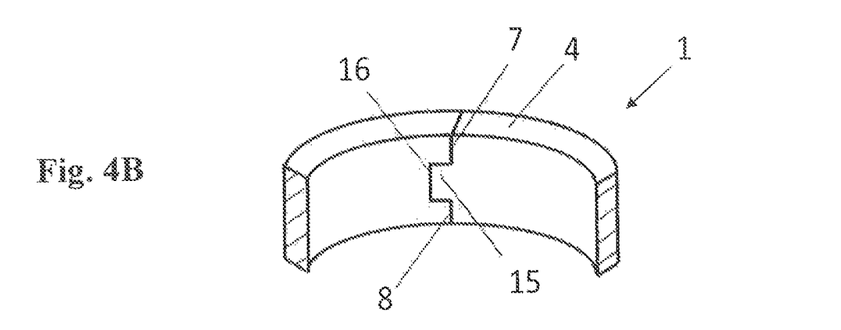
Figure 4C:
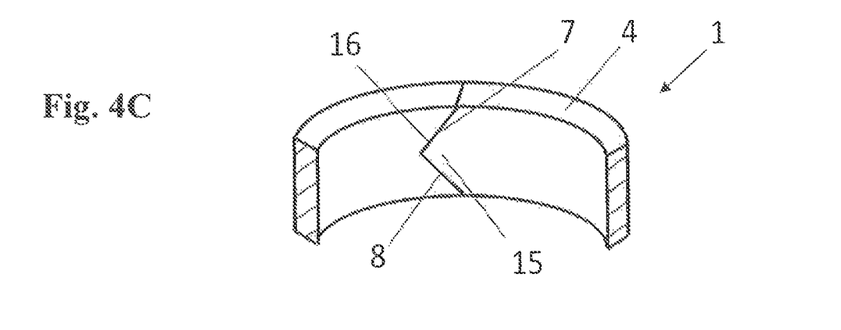
FIG. 4c shows a detailed view X in accordance with FIG. 3a of a third embodiment of a friction ring according to the invention.
Figure 4D:
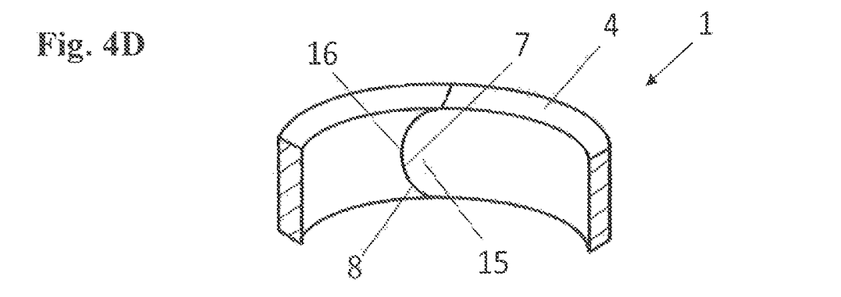
FIG. 4d shows a detailed view X in accordance with FIG. 3a of a forth embodiment of a friction ring according to the invention.

As to the embodiment from FIG. 4b, the first profile 15 is shaped as a rectangular projection and the second profile 16 is shaped as a rectangular recess. FIG. 4c shows an embodiment where the first profile 15 is shaped as a projection having the form of an arrowhead and the second profile 16 is shaped as a recess having the form of an arrowhead, whereas FIG. 4d shows an embodiment where the first profile 15 constitutes a convex projection and the second profile 16 constitutes a concave recess.

Figure 4E:
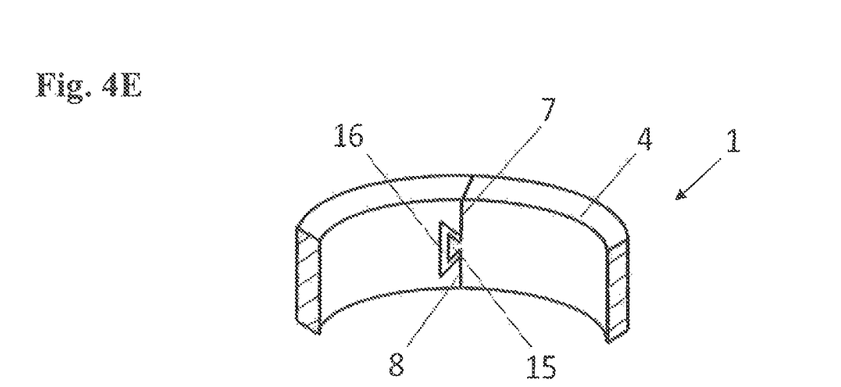
FIG. 4e shows a detailed view X in accordance with FIG. 3a of a fifth embodiment of a friction ring according to the invention.
Figure 4F:
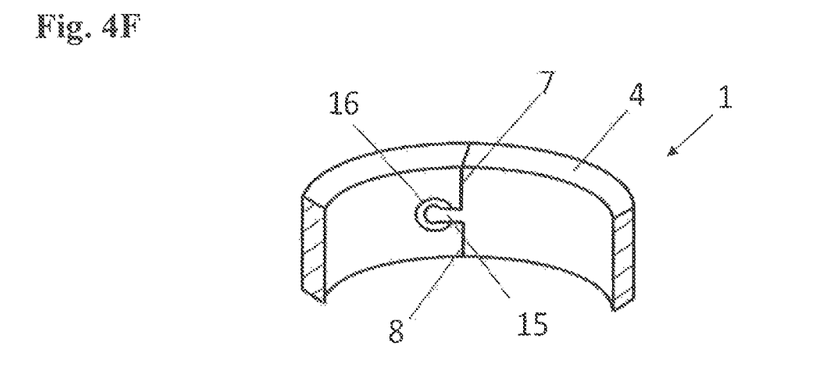
FIG. 4f shows a detailed view X in accordance with FIG. 3a of a sixth embodiment of a friction ring according to the invention.

FIG. 4e and FIG. 4f show embodiments where the first profile 15 and the corresponding second profile 16 are shaped in the form of a separating lock 17 in such a way that the circumference of the friction ring 1 in relation to the smallest circumference 13 is limited by the separating lock 17 to a predefinable maximum circumference. I.e. due to the separating lock 17 the friction ring 1 can deform elastically in the circumferential direction U only up to a certain circumference. FIG. 4e shows an embodiment where the first profile 15 is shaped as a projection having the form of a dovetail and the second profile 16 is shaped as a recess having the form of a dovetail. FIG. 4f shows an embodiment where the first profile 15 is executed as a circular projection and the second profile 16 as a circular recess.

It can be clearly recognized from FIG. 4a to FIG. 4f that the first separation surface 7 and the second separation surface 8 touch each other in an area. In all embodiments the circumference of the friction ring 1 can thereby no longer deform elastically towards a smaller circumference or a smaller diameter so that the friction ring 1 takes a controlled axial position relative to the synchronizer ring 2 during the synchronization.

The invention claimed is:

1. A friction ring for a synchronization unit of a gear changing transmission, said friction ring, when in an uninstalled state, being circumferentially pre-loaded and comprising:
   an annular front side;
   an annular rear side;
   a conical inner friction surface;
   a conical outer installation surface;
   the conical inner friction surface being defined by a friction angle ($\alpha 1$) relative to a friction ring axis;
   the outer installation surface being defined by a installation angle ($\alpha 2$) relative to the friction ring axis;
   a first separation surface facing and in contact with a second separation surface and defining a circumferential separation area in the friction ring,
   wherein the friction ring is prevented from contracting radially and circumferentially by said contact and is capable of expanding radially and circumferentially while being circumferentially pre-loaded.

2. The friction ring of claim 1, wherein a gap is created between the first separation surface and the second separation surface when the friction ring expands radially and circumferentially.

3. The friction ring of claim 1, wherein said contact between the first separation surface and the second separation surface is maintained while in the uninstalled state.

4. The friction ring of claim 1, wherein the first separation surface and the second separation surface move away from each other when the friction ring expands radially and circumferentially.

5. The friction ring of claim 1, wherein the first separation surface and the second separation surface move away from each other when the friction ring is subject to elastic circumferential deformation.

6. The friction ring of claim 1, wherein the circumferential separation area extends at a separation angle ($\beta$).

7. The friction ring of claim 1, wherein the circumferential separation area extends at an angle that is orthogonal to a circumferential direction.

8. The friction ring of claim 1, wherein the first separation surface comprises a first profile and the second separation surface comprises a second profile.

9. The friction ring of claim 8, wherein the first profile engages with the second profile.

10. The friction ring of claim 8, wherein the first profile is different from the second profile.

11. The friction ring of claim 8, wherein the first profile engages with the second profile so as to prevent axial displacement between the first and second separation surfaces.

12. The friction ring of claim 8, wherein the first profile locks with the second profile so as to prevent axial displacement between the first and second separation surfaces.

13. The friction ring of claim 8, wherein the first profile locks with the second profile so as to limit radial expansion of the friction ring to a maximum amount.

14. The friction ring of claim 8, wherein the first profile comprises one of:
   a projection; or
   a rectangular projection.

15. The friction ring of claim 8, wherein the second profile comprises one of:

a recess; or a rectangular recess.

16. The friction ring of claim 8, wherein one of:

the first profile comprises a dovetail projection and the second profile comprises a dovetail recess;

the first profile comprises a V-shaped recess and the second profile comprises a V-shaped projection; or the first profile comprises a convex shaped projection and the second profile comprises a concave shaped recess.

17. The friction ring of claim 8, wherein the first profile comprises a C-shaped projection and the second profile comprises a C-shaped recess.

18. The friction ring of claim 1, wherein the friction ring is one of:

a stamped steel part; or a shaped sheet-metal part.

19. A synchronization unit for a gear changing transmission of a vehicle comprising:

a synchronizer ring; and a friction ring in accordance with claim 1.

20. A gear changing transmission of a vehicle comprising:

a synchronizer unit in accordance with claim 19.

* * * * *